| United States Patent [19] | [11] Patent Number: 4,602,066 |
| Schuetz | [45] Date of Patent: Jul. 22, 1986 |

[54] COVALENTLY BONDED ABHERENT FOR MOLDED POLYMER SYSTEMS

[75] Inventor: James E. Schuetz, Midland, Mich.

[73] Assignee: The Dow Chemical Company, Midland, Mich.

[21] Appl. No.: 728,412

[22] Filed: Apr. 29, 1985

[51] Int. Cl.$^4$ .................... C08L 39/00; C08L 25/08
[52] U.S. Cl. ................................................. 525/326.7
[58] Field of Search ...................................... 525/326.7

[56] References Cited

U.S. PATENT DOCUMENTS 4,474,923 10/1984 Keskey et al. .................. 524/458
4,508,869 4/1985 Keskey et al. .................. 524/808

*Primary Examiner*—Ronald W. Griffin

[57] ABSTRACT

A stable abherent composition suitable for moldable polymer compositions comprising a polymer containing a cyclic iminoether group covalently bonded to a long chain fatty acid by a ring opening reaction of said cyclic iminoether group with the carboxyl group present on the fatty acid. A moldable polymeric composition containing the stable abherent composition and a process for preparing the stable abherent composition are also provided.

24 Claims, No Drawings

COVALENTLY BONDED ABHERENT FOR MOLDED POLYMER SYSTEMS

BACKGROUND OF THE INVENTION

The present invention relates to a stable abherent composition comprising a polymer having a pendent cyclic iminoether group covalently bonded to a long chain fatty acid compound suitable for use as an abherent. Common fatty acid compounds would include oleic, lauric, palmitic, and stearic.

Abherents are substances that prevent or reduce adhesion of a material to itself or another material. Synonyms for abherents include release agents, parting agents, lubricants, etc. Generally it is desirable to employ an abherent in the molding operations for polymeric articles to facilitate their removal from the mold and their moldability. Mold release agents are employed to assist in releasing molded articles from the mold surfaces, to assist the molded material to flow easily in the mold and to assist in the preparation of a fine molded surface.

Abherents known in the art include dry abherents such as talc, mica, silica powder; wet abherents such as oils; and chemical abherents such as silicone compounds, fluorocarbon polymers, and metallic stearates. Typically, abherents are employed in molding operations such as compression, transfer, injection, and reaction injection molding (RIM) to name a few. The abherent can either be coated on the molds or incorporated directly into the polymeric material to be molded. In the latter case problems can occur with regard to the stability of the abherent. Stability means the tendency of the abherent to decompose, migrate, or otherwise behave in an undesirable manner.

Generally, stability is a function of the molded article's environment and process parameters which are affected by the polymeric matrix the abherent is incorporated into. Forces acting upon the stability of the abherent include temperature, pressure, and other chemicals or materials that can come in contact with the unmolded or molded polymeric vehicle which contains the abherent compound.

It is therefore desirable to provide abherents having improved stability in a polymeric matrix.

SUMMARY OF THE INVENTION

The present invention is a stable abherent composition comprising a polymer containing a pendent cyclic iminoether group covalently bonded to a long chain fatty acid by a ring opening reaction of the cyclic iminoether group with the carboxyl group present on the fatty acid. Typically, the cyclic iminoether group is a 2-alkenyl-2-oxazoline, preferably 2-isopropenyl-2-oxazoline. In one aspect, the polymer is a polystyrene and a typical fatty acid is stearic acid.

In another aspect, the present invention is a moldable composition containing the aforedescribed stable abherent composition. A preferred moldable polymer composition is styrene and a preferred polymer containing a cyclic iminoether group is styrene/ 2-isopropenyl-2-oxazoline copolymer.

In yet another aspect, the present invention provides for a process for preparing a stable abherent composition comprising reacting a polymer containing a pendent cyclic iminoether group with a long chain fatty acid suitable for use as an abherent whereby a covalent bond is formed between the fatty acid and the pendent cyclic iminoether group by a ring opening reaction of said cyclic iminoether group with the carboxyl group of the fatty acid.

The present invention is useful in the molding of complex shapes and in fairly simple moldings where good mold release is desirable. Advantageously, the subject abherent composition is very stable due to the characteristic covalent bonding of the fatty acid abherents.

DETAILED DESCRIPTION OF THE INVENTION

The present abherent composition is generally described as a polymer containing a pendent cyclic iminoether group wherein the pendent cyclic iminoether group forms a covalent bond with a monocarboxylated organic group. The monocarboxylated organic group is preferably a long chain fatty acid compound known to be useful as an abherent. By being covalently bonded to the polymer, the abherent has increased stability over an unreacted abherent compound.

The abherents of the present invention have an increased stability because they are covalently bonded to the polymer via the pendent cyclic iminoether group. Abherents prepared in this manner have a decreased ability to migrate in a polymeric matrix in which they are incorporated, and; therefore, resist exuding from the polymer. Thus the subject abherents can be permanently incorporated into a polymeric matrix.

The polymer containing a pendent cyclic iminoether group is generally a polymer which (a) can be modified to contain pendent cyclic iminoether groups, or (b) can be copolymerized with a monomer which contains or can be modified to contain pendent cyclic iminoether groups. In one preferred embodiment, the polymer is advantageously a polymer of an addition polymerizable monomer copolymerized with a monomer of an ethylenically unsaturated cyclic iminoether.

Representative polymers of the addition polymerizable monomers are polymers of a conjugated diene such as butadiene or isoprene as well as copolymers thereof; a vinylidene halide such as vinylidene chloride or copolymers thereof; acrylonitrile; an ether of an alpha beta ethylenically unsaturated carboxylic acid such as alkyl esters of acrylics or methacrylic acid and copolymers thereof; a monovinylidene aromatic compound such as styrene, vinyltoluene, t-butyl styrene, vinylnaphthalene, and the like. Ethylenically unsaturated cyclic iminoethers, in particular, 2-alkenyl-2-oxazoline generally resemble styrene in their polymerization reactions. Accordingly, as a rule of thumb polymers of monomers which are copolymerizable with styrene will generally be usefully employed herein. A preferred copolymer containing pendent cyclic iminoether groups for the subject invention is a styrene/2-alkenyl-2-oxazoline copolymer.

The subject cyclic iminoether groups are structurally depicted as follows:

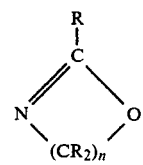

wherein each R is independently hydrogen, or an inertly substituted hydrocarbon containing 1 to 18 carbon atoms and n is a number from about 1 to about 5, said cyclic iminoether group can be attached to the polymer chain through any of the carbon atoms in the ring, preferably the cyclic iminoether is a 2-iminoether, i.e., is attached to the polymer chain through the two carbon atoms to yield a pendent structure as defined above. Preferably each R is a hydrogen or a lower alkyl and n is 1, 2, or 3. More preferably each R is hydrogen, n is 2, and the cyclic iminoether is a 2-oxazoline group. By "inertly substituted", it is meant that the reference group contains no functional group which would interfere with the polymerization or curing of the oxazoline group.

Preferably the cyclic iminoether groups are 2-alkenyl-2-oxazolines wherein said alkenyl group contains from about 2 to about 8, preferably 2 to 4 carbon atoms. More preferably, said 2-alkenyl-2-oxazoline monomer is 2-isopropenyl-2-oxazoline.

In the preparation of the subject abherent composition, the polymers containing pendent cyclic iminoether groups as described above are reacted with the carboxyl group present on a long chain fatty acid to form a stable abherent. Generally, a polymer having a pendent cyclic iminoether group is reacted with the carboxylic acid group by bringing said polymer and said carboxylic acid group in contact with each other at a temperature from about 50° C. to about 350° C. This reaction can be carried out without a solvent or by bringing the polymer and the carboxylic acid group in contact with each other while they are in a molten state. Optionally, the reaction can be performed in the presence of an organic solvent such as alcohols, heptane, benzene, toluene, etc. It is also possible to react the polymer containing the pendent cyclic iminoether group and the carboxylic acid group by mixing them together in a heat molding operation.

The foregoing operations will form a covalent bond between the long chain fatty acid and the polymer containing a pendent cyclic iminoether group. It is this covalently bonded composition that forms the subject abherent composition which has improved stability when dispersed in a polymeric matrix. In order to insure the permanent incorporation of the abherent composition into the polymeric matrix, it is desirable to employ a polymer having a cyclic iminoether group which is compatible with the polymeric matrix. For example, in the molding of styrene it would be desirable to employ an abherent composition comprising a styrene/ 2-alkenyl-2-oxazoline copolymer which has been reacted with an appropriate long chain fatty acid.

The abherent portion of the subject abherent composition is generally described as long chain fatty acids. The term "long chain fatty acid" is employed in its traditional sense and therefore indicates a chain of alkyl groups containing from 4 to 22 carbon atoms (usually even numbers) and characterized by a terminal carboxyl group. The fatty acids may be solid, semi-solid or liquid, and can be saturated or unsaturated fatty acids. Typical examples of fatty acids are butyric, lauric, palmitic, stearic, oleic, and linoleic. The preferred fatty acid is stearic acid. While long chain fatty acids are preferred, it is understood that other abherent compounds having an electrophilic group capable of reacting with the cyclic iminoether group pendent from the polymer chain can also be employed.

It is therefore envisioned that other abherent compounds having electrophilic groups containing an active hydrogen such an amine, hydroxyl, mercaptan, epoxy, or anhydride groups can be suitable for forming a covalent bond with the cyclic iminoether group to thereby provide a stabilized abherent composition. Common abherents are described in Vol. 1, 3rd Ed., Kirk-Othmer, *Encyclopedia of Chemical Technology*, pp. 1–9 1 (1978).

EXAMPLE 1

A stable abherent composition was prepared as follows:

In a Brabender Plasti-Corder Torque Rheometer having a jacket temperature of 220° C., and running at 50 rpm was added 42.3 g of a 97.5 styrene/2.5 percent 2-isopropenyl-2-oxazoline copolymer and 2.7 g of stearic acid. The blend was mixed for approximately 5 minutes and removed from the Brabender. An analytical analysis of the composition indicated that only 4 percent of the carboxyl groups remained unreacted. Thus, the majority of the carboxyl groups had reacted with the pendent oxazoline groups to form a covalent bond to thus form a stable abherent composition.

What is claimed is:

1. A stable abherent composition comprising a polymer containing a pendent cyclic iminoether group covalently bonded to a long chain fatty acid by a ring opening reaction of said cyclic iminoether group with the carboxyl group present on said fatty acid.

2. The composition of claim 1 wherein said cyclic iminoether group is a 2-alkenyl-2-oxazoline.

3. The composition of claim 2 wherein said 2-alkenyl-2-oxazoline is 2-isopropenyl-2-oxaoline.

4. The composition of claim 1 wherein said polymer is styrene.

5. The composition of claim 4 wherein said cyclic iminoether group is a 2-alkenyl-2-oxazoline.

6. The composition of claim 5 wherein said 2-alkenyl-2-oxazoline is 2-isopropenyl-2-oxazoline.

7. The composition of claim 1 wherein said fatty acid is stearic acid.

8. A moldable composition containing a stable abherent composition comprising a polymer containing a pendent cyclic iminoether group covalently bonded to a long chain fatty acid by a ring opening reaction of said cyclic iminoether group with the carboxyl group present on said fatty acid.

9. The composition of claim 8 wherein said cyclic iminoether group is a 2-alkenyl-2-oxazoline.

10. The composition of claim 9 wherein said 2-alkenyl-2-oxazoline is 2-isopropenyl-2-oxazoline.

11. The composition of claim 8 wherein said polymer is styrene.

12. The composition of claim 11 wherein said cyclic iminoether group is a 2-alkenyl-2-oxazoline.

13. The composition of claim 12 wherein said 2-alkenyl-2-oxazoline is 2-isopropenyl-2-oxazoline.

14. The composition of claim 8 wherein said fatty acid is stearic acid.

15. The composition of claim 8 wherein said moldable polymeric composition is styrene.

16. The composition of claim 15 wherein said polymer containing a cyclic iminoether group is a styrene/ 2-isopropenyl-2-oxazoline copolymer.

17. The composition of claim 16 wherein said long chain fatty acid is stearic acid.

18. A process for preparing a stable abherent composition comprising reacting a polymer containing a pendent cyclic iminoether group with a long chain fatty acid suitable for use as an abherent whereby a covalent bond is formed between said fatty acid and said pendent cyclic iminoether group by a ring opening reaction of said cyclic iminoether group with the carboxyl group of said fatty acid.

19. The composition of claim 18 wherein said cyclic iminoether group is a 2-alkenyl-2-oxazoline.

20. The composition of claim 19 wherein said 2-alkenyl-2-oxazoline is 2-isopropenyl-2-oxazoline.

21. The composition of claim 18 wherein said polymer is styrene.

22. The composition of claim 21 wherein said cyclic iminoether group is a 2-alkenyl-2-oxazoline.

23. The composition of claim 22 wherein said 2-alkenyl-2-oxazoline is 2-isopropenyl-2-oxazoline.

24. The composition of claim 18 wherein said fatty acid is stearic acid.

* * * * *